United States Patent
Robustelli

(10) Patent No.: US 11,195,407 B1
(45) Date of Patent: Dec. 7, 2021

(54) SYSTEMS AND METHODS FOR FINDING LOST DEVICES

(71) Applicant: ZEBRA TECHNOLOGIES CORPORATION, Lincolnshire, IL (US)

(72) Inventor: Michael Robustelli, Smithtown, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/091,910

(22) Filed: Nov. 6, 2020

(51) Int. Cl.
*G08B 1/08* (2006.01)
*G08B 21/24* (2006.01)
*H04W 4/029* (2018.01)

(52) U.S. Cl.
CPC ............ *G08B 21/24* (2013.01); *H04W 4/029* (2018.02)

(58) Field of Classification Search
CPC ................ G08B 21/24; H04W 4/029
USPC .................................................. 340/539.32
See application file for complete search history.

(56) References Cited

U.S. PATENT DOCUMENTS

| | | | |
|---|---|---|---|
| 2015/0098304 A1* | 4/2015 | Harvey ................. | G01S 5/183 367/87 |
| 2016/0165570 A1* | 6/2016 | Kim ........................ | G01S 5/02 455/456.2 |

* cited by examiner

*Primary Examiner* — Tai T Nguyen

(57) ABSTRACT

A mobile computing device includes: a beacon transmitter; a receiver; a controller connected with the beacon transmitter and the receiver, the controller configured to: control the beacon transmitter to broadcast a lost device signal, the lost device signal configured for locating the mobile computing device and including an indicator of a designated reception window; during the designated reception window, enable the receiver; and in response to receiving a discovery command from a searching device, control the beacon transmitter to transmit a response signal for locating the mobile computing device.

25 Claims, 7 Drawing Sheets

SYSTEMS AND METHODS FOR FINDING LOST DEVICES

BACKGROUND

When mobile computing devices are lost or misplaced, they may broadcast signals to advertise their presence and provide a means for locating them. These signals may not provide a precise location and may still require trial and error, and time spent for a user to physically search for the lost device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
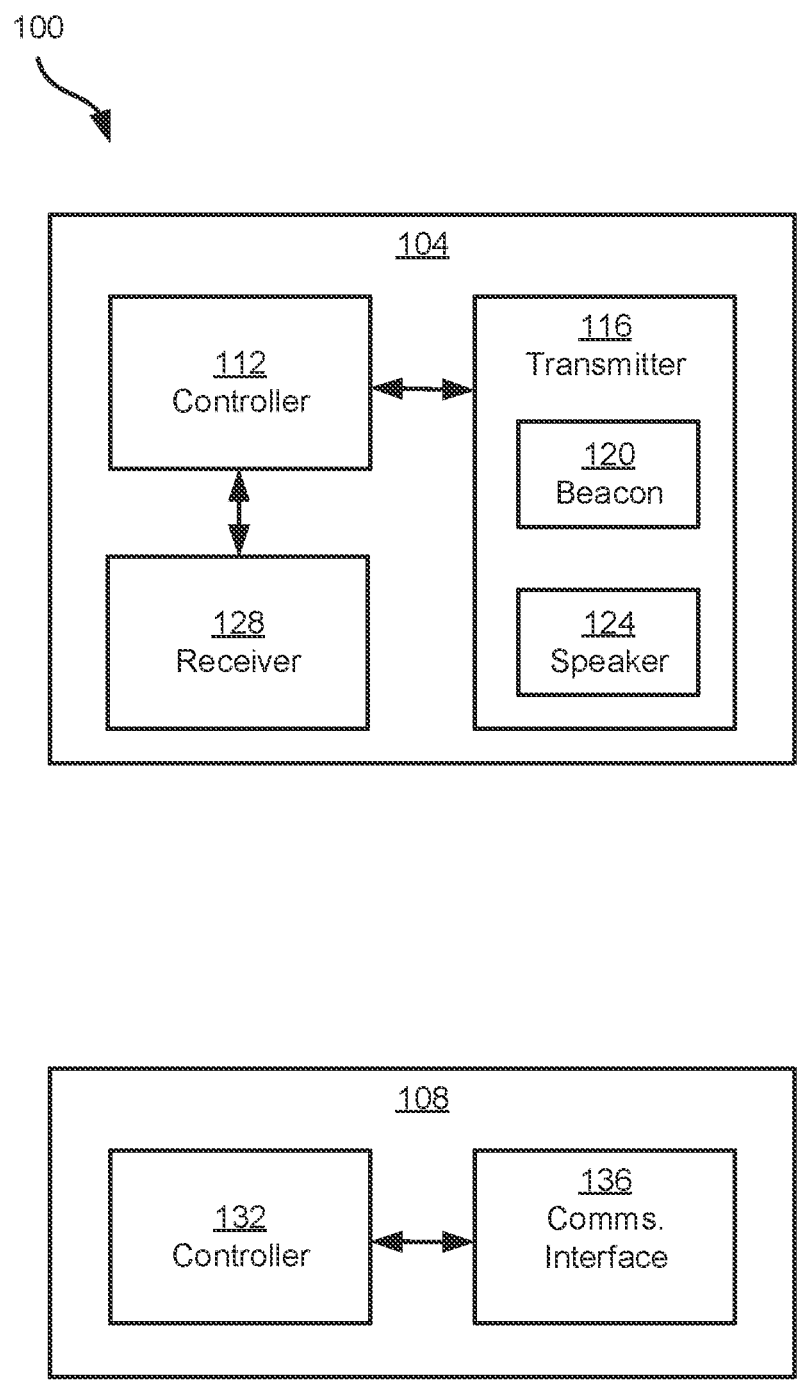
FIG. 1 is a block diagram of a system for finding a lost device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Searching for lost devices is a time-consuming, manual process. Some methods allow lost devices to audibly sound out to aid in discovery of the lost device, which provides a more natural guide for a user to locate the lost device. However, generating an audio signal may drain the battery of a lost device and limit the amount of time the lost device is able to provide a lost device or audio signal to assist with locating the lost device. Preferably, the lost device may receive an instruction from a searching device to begin generating an audio signal when the searching device is nearby. However, having an active receiver may also drain the battery of the lost device and limit the amount of time the lost device is able to provide a lost device or audio signal to assist with locating the lost device.

Examples disclosed herein are directed to a mobile computing device comprising: a beacon transmitter; a receiver; a controller connected with the beacon transmitter and the receiver, the controller configured to: control the beacon transmitter to broadcast a lost device signal, the lost device signal configured for locating the mobile computing device and including an indicator of a designated reception window; during the designated reception window, enable the receiver; and in response to receiving a discovery command from a searching device, control the beacon transmitter to transmit a response signal for locating the mobile computing device.

Additional examples disclosed herein are directed to a computing device comprising: a communications interface; a controller interconnected with the memory and the communications interface, the controller configured to: in response to receiving a lost device message from a lost device, determine, from the lost device message, a designated reception window; and during the designated reception window, control the communications interface to transmit a discovery command to the lost device, the discovery command including parameters for a response message configured for locating the lost device.

Additional examples disclosed herein are directed to a method comprising: broadcasting, from a beacon transmitter of a lost device, a lost device signal, the lost device signal including an indicator of a designated reception window; during the designated reception window, enabling a receiver of the lost device; receiving a discovery command from a searching device during the designated reception window; and in response to the discovery command, transmitting a response signal for locating the lost device.

Additional examples disclosed herein are directed to a method comprising: receiving, at a searching device, a lost device message from a lost device; in response to receiving the lost device message, determining, from the lost device message, a designated reception window; and during the designated reception window, transmitting a discovery command to the lost device, the discovery command including parameters for a response message configured for locating the lost device.

FIG. 1 depicts a system 100 for finding lost devices. The system 100 includes a lost device 104 and a searching device 108. The system 100 is generally to enable the lost device 104 to be found more easily by allowing the searching device 108 to issue commands to the lost device 104 when the searching device 108 is nearby. For example, the searching device 108 may cause the lost device 104 to generate an audio signal (e.g., a beeping or ringing sound or the like) to allow a user of the searching device 108 to determine the origin of the noise. The system 100 further preserves the battery of the lost device 104 by enabling the receiving capabilities of the lost device 104 at designated reception windows. An indicator of the next designated reception window is broadcasted periodically by the lost device 104 to enable the searching device 108 to determine the designated reception window and send the commands to the lost device 104 within the designated reception window. By limiting the receiving capabilities to the designated reception windows, the lost device 104 incurs a lower power penalty and can maintain its battery after being lost. Additionally, the system 100 allows for lower lost device signal traffic and lower searching traffic.

The lost device 104 is a mobile computing device such as a mobile phone, handheld computer, barcode scanner, tablet, or the like. The lost device 104 includes a controller 112 configured to control a discovery operation of the lost device 104 to enable the lost device 104 to be discovered. The controller 112 may be, for example, a processor interconnected with a non-transitory computer-readable storage medium, such as a memory, storing computer-readable instructions for execution by the processor. In particular, execution of the instructions may configure the controller 112 to perform various functions discussed below in greater detail and related to the discovery operation. Those skilled in the art will appreciate that functionality implemented by the controller 112 may also be implemented by one or more specially designed hardware and firmware components, such as a field-programmable gate array (FPGA), application-specific integrated circuit (ASIC), and the like in other implementations. In an implementation, the controller 112 may be a special purpose processor which may be implemented via dedicated logic circuitry of an ASIC, an FPGA, or the like.

The lost device 104 further includes a transmitter 116 configured to transmit a variety of signals. In particular, the transmitter 116 includes a beacon transmitter 120 (also referred to herein as simply the beacon 120) and an audio generator, such as a speaker 124. The beacon 120 may be, for example, a Bluetooth low energy beacon, or other suitable short-range wireless communications protocols. In particular, the beacon 120 is configured to broadcast a lost device signal or message including data pertaining to the lost device 104 and an indicator of a next designated reception window. For example, the indicator may include a datetime value for the designated reception window. In such examples, the lost device signal may further include a timestamp for the lost device signal to allow the searching device 108 to reconcile its date and time with that of the lost device 104 in order to determine the designated reception window. In other examples, the indicator may be a countdown value until the designated reception window. In particular, using a countdown value may allow the searching device 108 to simply countdown from the countdown value, rather than reconciling the dates and times of the lost device 104 and the searching device 108.

The lost device signal may further include device data for the lost device 104, or other pertinent data. For example, the lost device signal may include an indicator of audio capabilities of the lost device 104, to allow the searching device 108 to provide suitable discovery commands. In other examples, the lost device signal may include indicators of other capabilities (e.g., vibration or other outputs) to assist in locating the lost device 104. The lost device signal may further include a timestamp, an identifier of the lost device 104 (e.g., a MAC address or the like), a battery capacity, and an estimate of duration lost.

The speaker 124 is generally configured to generate an audio signal, such as a beeping noise, a ringing noise, or another suitable noise to assist a user of the searching device 108 with locating the lost device 104.

The lost device 104 further includes a receiver 128 configured to receive signals, for example via a Bluetooth low energy or other short-range wireless communication protocol. The receiver 128 is interconnected with the controller 112 and may be enabled and disabled by the controller 112. Generally, the receiver 128 may be enabled during the designated reception windows and disabled outside the designated reception windows to conserve battery power of the lost device 104.

In some examples, the beacon 120 and the speaker 124 may be implemented as separate elements, with the beacon 120 and the receiver 128 implemented as a Bluetooth transceiver. The transmitter 116 and the receiver 128 may be secondary communications components. In particular, the lost device 104 may include a main communications interface including suitable hardware (e.g., a main transmitter, a main receiver, a network interface controller or the like) for further communications, such as wide area network, mobile network, Bluetooth and other communications.

As the main communications interface may consume more battery power, it may be shut down when the lost device 104 incurs a shutdown condition, such as when the battery of the lost device 104 drops below a threshold level, or when the lost device 104 is turned off. That is, in a shutdown condition, the lost device 104 may utilize secondary components rather than the main communications interface for the discovery operation. Thus, for example, the transmitter 116 may be activated in response to a shutdown condition of the lost device 104. Similarly, the controller 112 may begin to designate reception windows for the receiver 128 in response to the shutdown condition of the lost device 104.

The searching device 108 is a computing device such as a handheld computer, a mobile phone, a tablet, or the like. The searching device 108 includes a controller 132 configured to control a searching operation of the searching device 108 to find the lost device 104. The controller 132 may be, for example, a processor interconnected with a non-transitory computer-readable storage medium, such as a memory, storing computer-readable instructions for execution by the processor. In particular, execution of the instructions may configure the controller 132 to perform various functions discussed below in greater detail and related to the searching operation. Those skilled in the art will appreciate that functionality implemented by the controller 132 may also be implemented by one or more specially designed hardware and firmware components, such as a field-programmable gate array (FPGA), application-specific integrated circuit (ASIC), and the like in other implementations. In an implementation, the controller 132 may be a special purpose processor which may be implemented via dedicated logic circuitry of an ASIC, an FPGA, or the like.

The searching device 108 further includes a communications interface 136 interconnected with the controller 132. The communications interface 136 includes suitable hardware (e.g., transmitters, receivers, network interface controllers and the like) allowing the searching device 108 to communicate with other computing devices, such as the lost device 104. The specific components of the communications interface 136 are selected based on the type of communication links that the searching device 108 communicates over. Thus, the searching device 108 may be configured for low energy short-range wireless communications, such as Bluetooth low energy.

Figure 2:
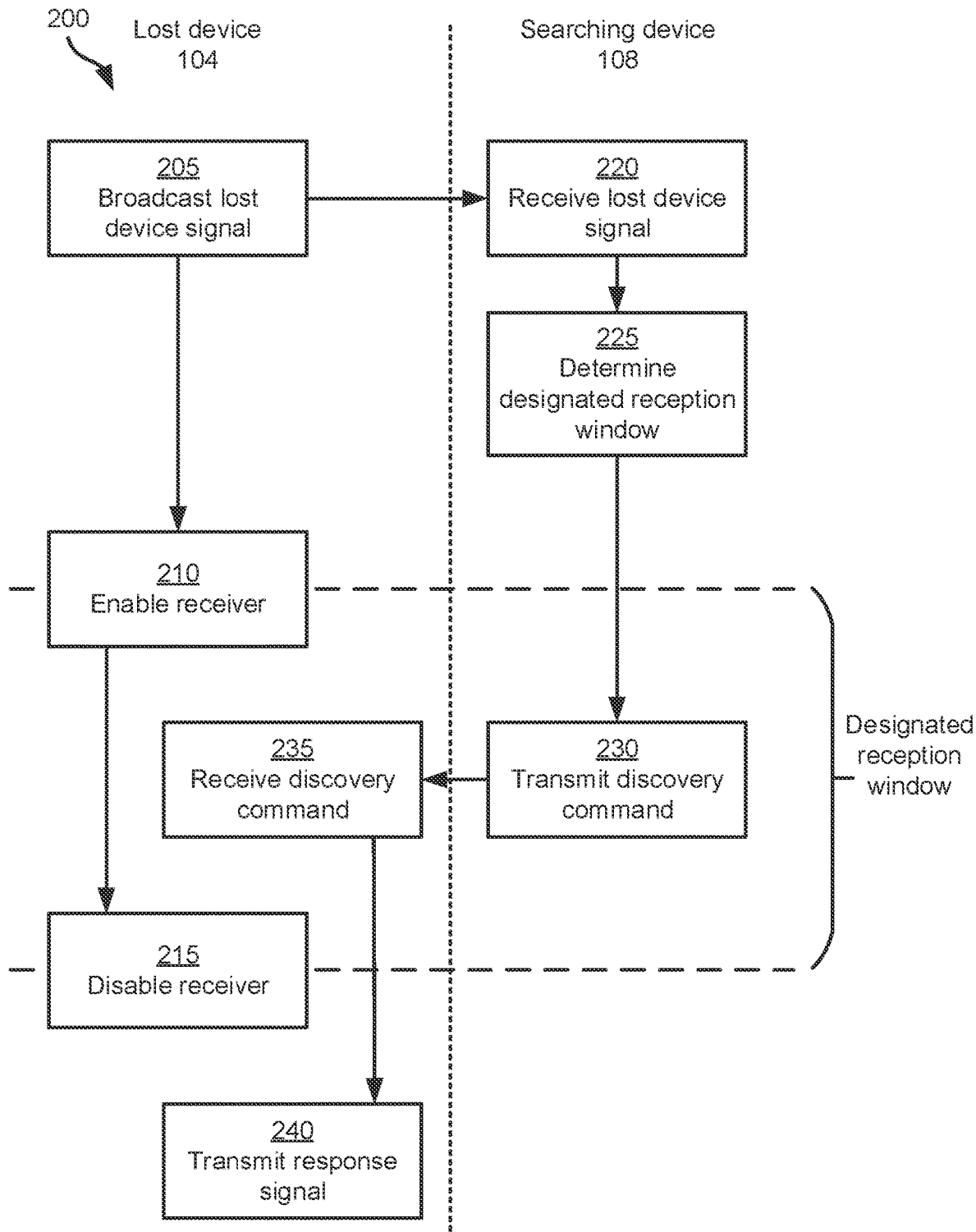
FIG. 2 is a flowchart of a method of finding lost devices.

Turning now to FIG. 2, the functionality implemented by the lost device 104 and the searching device 108 will be discussed in greater detail. FIG. 2 illustrates a method 200 of finding a lost device. The method 200 will be discussed in conjunction with its performance in the system 100, and particularly by the lost device 104 and the searching device 108. The method 200 will be described with reference to the components of FIG. 1. In other implementations, the method 200 may be performed by other suitable computing devices or in other suitable systems.

The method 200 is initiated at block 205, for example, when the lost device 104 reaches its shutdown condition. For example, when the lost device 104 reaches a 4% battery level, it may power off to conserve the remaining battery for a discovery operation. At block 205, the lost device 104, and in particular the beacon 120, broadcasts a lost device signal.

The lost device signal includes an indicator of a designated reception window during which the receiver 128 will be enabled and the lost device 104 may receive data transmissions. The indicator may be, for example, a countdown value until the designated reception window. In other examples, the indicator may be a datetime value of the designated reception window. Further, the indicator may include a length of the designated reception window (e.g., 150 ms). The lost device signal may further include an indication of transmitter capability indicating, for example, that the transmitter 116 includes the speaker 124 and hence may generate an audio signal. The lost device signal may further include other data including a current date and time at the lost device 104, a device identifier, a battery capacity, and a duration lost. In particular, the beacon 120 may broadcast the lost device signal periodically (e.g., at a rate of 1 Hz) until the lost device signal is received by a searching device.

Additionally, the lost device 104 periodically enables the receiver at block 210 at the beginning of each designated reception window for the duration of the designated reception window and disables the receiver at block 215, at the end of each designated reception window to preserve the battery of the lost device 104. The lost device 104 may select a new designated reception window and return to block 205 to broadcast a lost device signal with an indicator of the new designated reception window. For example, the lost device 104 may be configured to have a designated reception window every 15 seconds.

Figure 3:
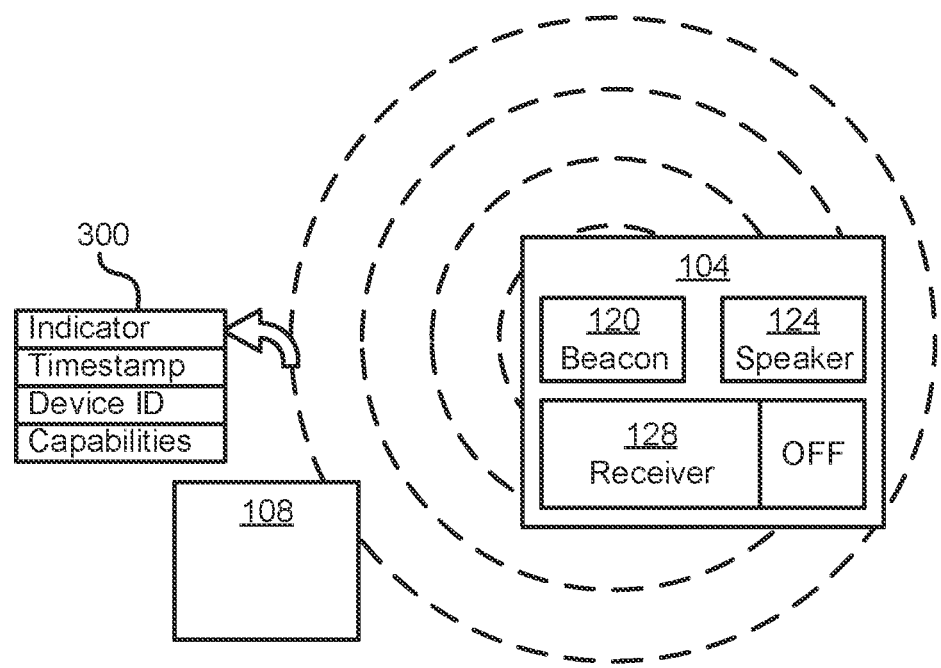
FIG. 3 is a schematic diagram of a lost device sending a lost device signal to a searching device in the system of FIG. 1.

At block 220, when the searching device 108 is within broadcast range of the beacon 120, the searching device 108 receives a lost device message (e.g., an instance of the lost device signal broadcasted by the lost device 104). For example, referring to FIG. 3, the lost device 104 broadcasts a lost device signal 300 from the beacon 120. The lost device signal 300 includes an indicator of the designated reception window, a timestamp of the lost device signal 300, a device identifier for the lost device 104, and further transmitter capabilities of the lost device 104 (i.e., in the present example, a speaker to generate an audio signal). The lost device signal 300 is received at the searching device 108, for example, as a lost device message, when the searching device 108 is within the broadcast range of the beacon 120.

Returning to FIG. 2, at block 225, in response to receiving the lost device signal, the searching device 108 determines the designated reception window for the lost device 104 based on the indicator included in the lost device signal. For example, when the indicator is a countdown value, the searching device 108 may initiate a countdown beginning at the countdown value. When the countdown reaches zero, the searching device 108 determines that the designated reception window is open and reception of data transmissions by the lost device 104 is enabled. In another example, when the indicator is a datetime value, the searching device 108 may also extract the current date and time at the lost device 104 from the lost device signal and reconcile the lost device date and time with the searching device date and time to determine the designated reception window.

Figure 4:
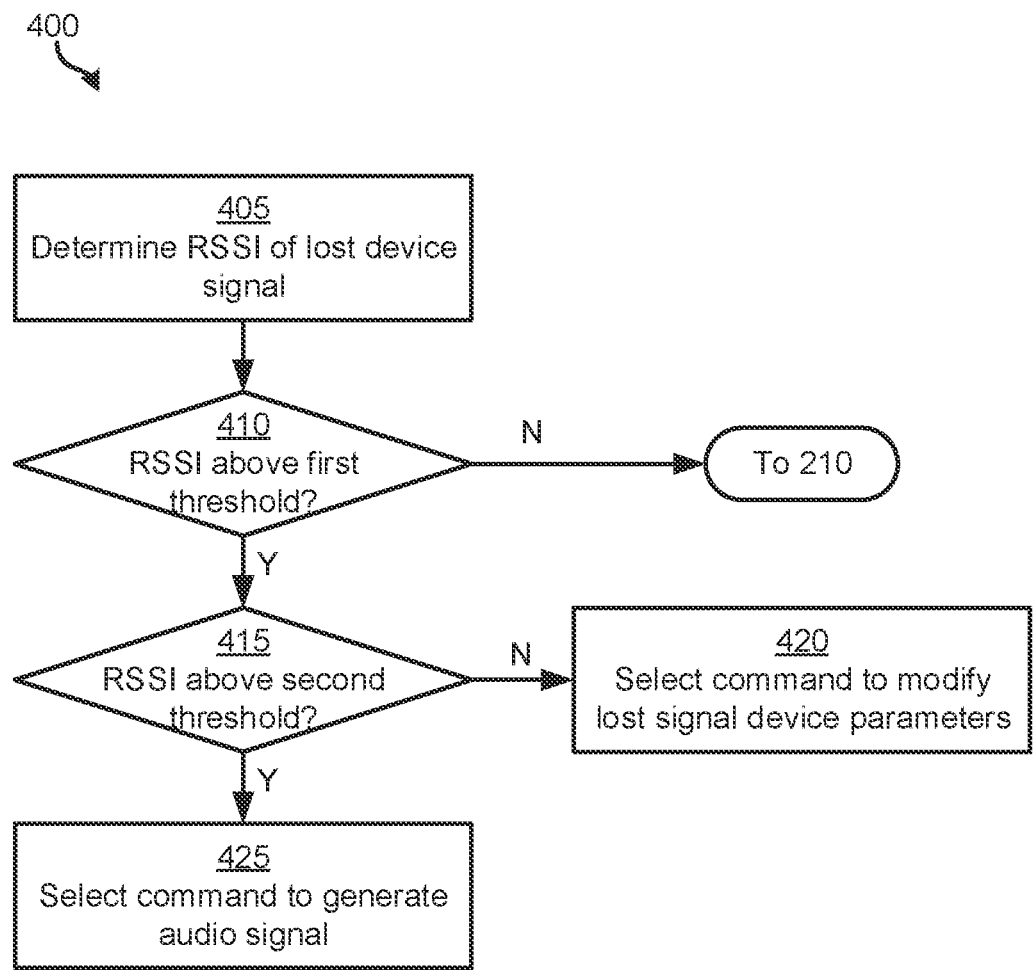
FIG. 4 is a flowchart of transmitting a discovery command at block 230 of the method of FIG. 2.

After having determined when the designated reception window is, the searching device 108 waits until the designated reception window before proceeding to block 230. At block 230, having determined that the designated reception window is open, the searching device 108 transmits a discovery command, such as an instruction to generate an audio signal. In some examples, the searching device 108 may select a discovery command from a set of discovery commands. For example, referring to FIG. 4, an example method 400 of issuing a discovery command is illustrated. In particular, the discovery command may be selected from a set of discovery commands based on a received signal strength indication of the lost device signal.

At block 405, the searching device 108 determines a received signal strength indication (RSSI) of the lost device signal. In particular, the RSSI of the lost device signal may be proportional to and representative of the distance between the lost device 104 and the searching device 108. Accordingly, the searching device 108 may select a different discovery command to facilitate locating the lost device 104 based on the predicted distance between the lost device 104 and the searching device 108.

At block 410, the searching device 108 determines whether the RSSI determined at block 405 meets a first threshold strength. If the determination is negative, the method 400 returns to block 220 of the method 200 to continue receiving the broadcasted lost signal device until the RSSI of the lost signal device is stronger.

If, at block 410, the searching device 108 determines that the RSSI is above the first threshold, the method 400 proceeds to block 415. At block 415, the searching device 108 determines whether the RSSI determined at block 405 meets a second threshold strength. In other examples, when only one RSSI threshold is utilized, the method 400 may proceed directly to block 425.

If the determination at block 415 is negative, the method 400 proceeds to block 420. At block 420, the searching device 108 selects a discovery command to cause the lost device 104 to (i) modify the lost device signal according to parameters defined in the discovery command and (ii) broadcast the modified lost device signal. In particular, the searching device 108 may first generate a discovery command including parameters to modify the lost device signal. For example, the parameters may include a new frequency at which to broadcast the lost device signal. Additionally, the discovery command may include a device identifier of the searching device 108, a timestamp of the discovery command, and other data. The additional data included in the discovery command may, in some examples, be used as additional parameters to modify the lost device signal, for example, by including the additional data in lost device signal to facilitate identification of a response to the discovery command. After having generated the discovery command, the searching device 108 transmits the discovery command to the lost device 104 during the designated reception window (e.g., by broadcasting the discovery command during the designated reception window).

If the searching device 108 determines at block 415 that the RSSI of the lost device signal is above the second threshold strength, the method 400 proceeds to block 425. At block 425, the searching device 108 selects a discovery command to cause the lost device 104 to generate an audio signal. In particular, the searching device 108 may first generate a discovery command including instructions for the lost device 104 to generate the audio signal. The discovery command may additionally include a device identifier of the searching device 108, a timestamp of the discovery command, and other data. The additional data included in the discovery command may, in some examples, be used as additional parameters to modify the lost device signal, for example, by including the additional data in lost device signal to facilitate identification of a response to the discovery command. After having generated the discovery command, the searching device 108 transmits the discovery command to the lost device 104 during the designated reception window (e.g., by broadcasting the discovery command during the designated reception window).

As will be appreciated, in other examples, other discovery commands may be selected according to various threshold strengths, and further in consideration of the transmitter capabilities of the lost device 104. For example, the searching device 108 may employs a single RSSI threshold and blocks 415 and 420 may be omitted. Further, the searching device 108 may select a discovery command prior to initiation of the designated reception window and, once the designated reception window opens, simply transmit the selected discovery command.

At block 235, the lost device 104 receives the discovery command during the designated reception window.

At block 240, in response to receiving the discovery command at block 235, the lost device 104 transmits a response signal to facilitate locating the lost device 104. In particular, the response signal may be configured according to the parameters defined in the discovery command. For example, the response signal may be a modified lost device signal, an audio signal, or another suitable response.

Figure 5:
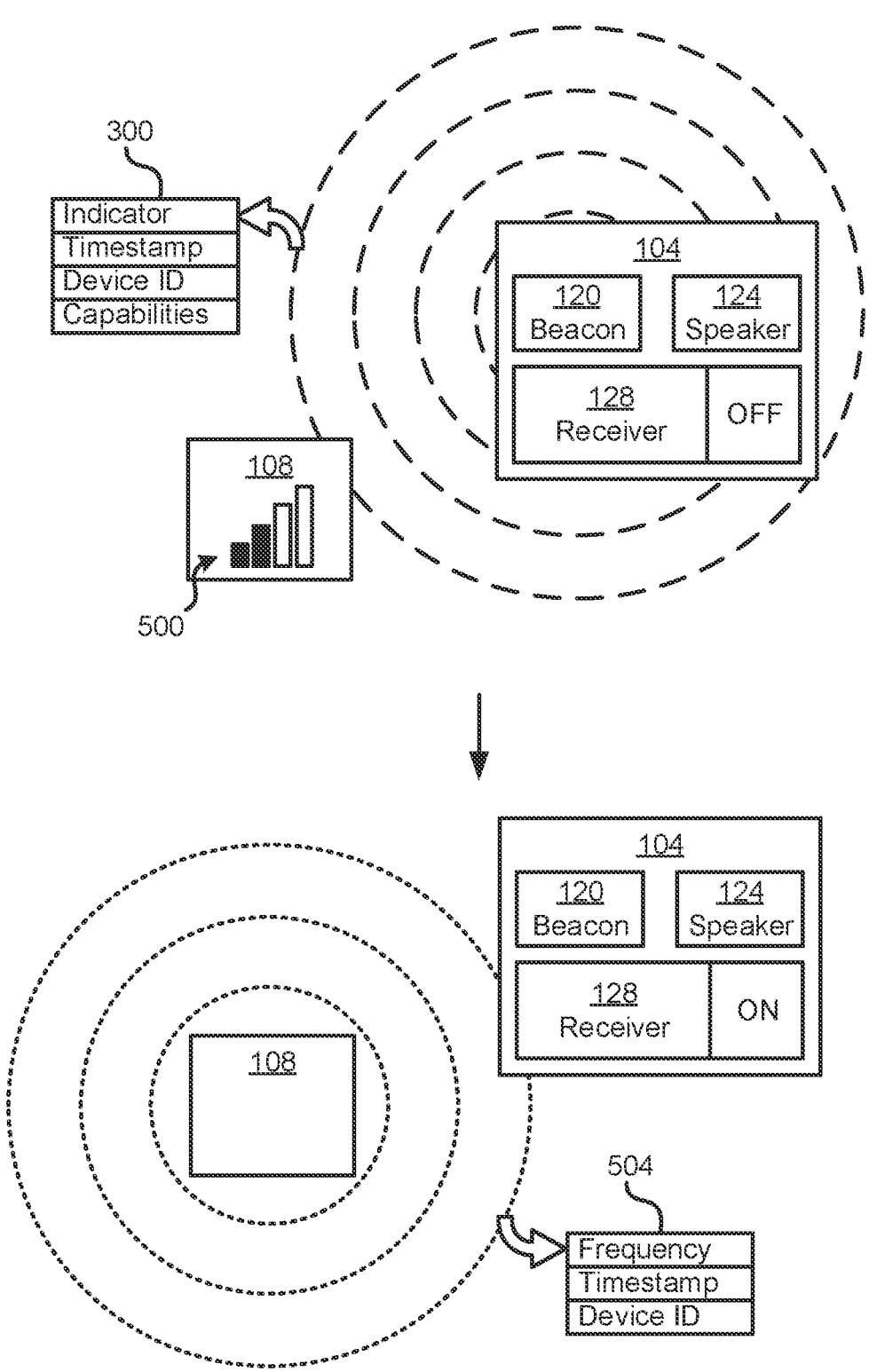
FIG. 5 is a schematic diagram of an execution of the method of FIG. 2 to find a lost device.

For example, referring to FIG. 5, after receiving the lost device signal 300, the searching device 108 determines an RSSI 500 of the lost device signal 300. The searching device 108 may select a discovery command 504 to transmit based on the RSSI 500. During the designated reception window (i.e., when the receiver 128 of the lost device 104 is ON), the searching device 108 broadcasts the discovery command 504. The discovery command 504 in the present example, includes a new frequency at which the lost device 104 is to broadcast the lost device signal, a timestamp of the discovery command 504, and a device ID of the searching device 108.

Figure 6:
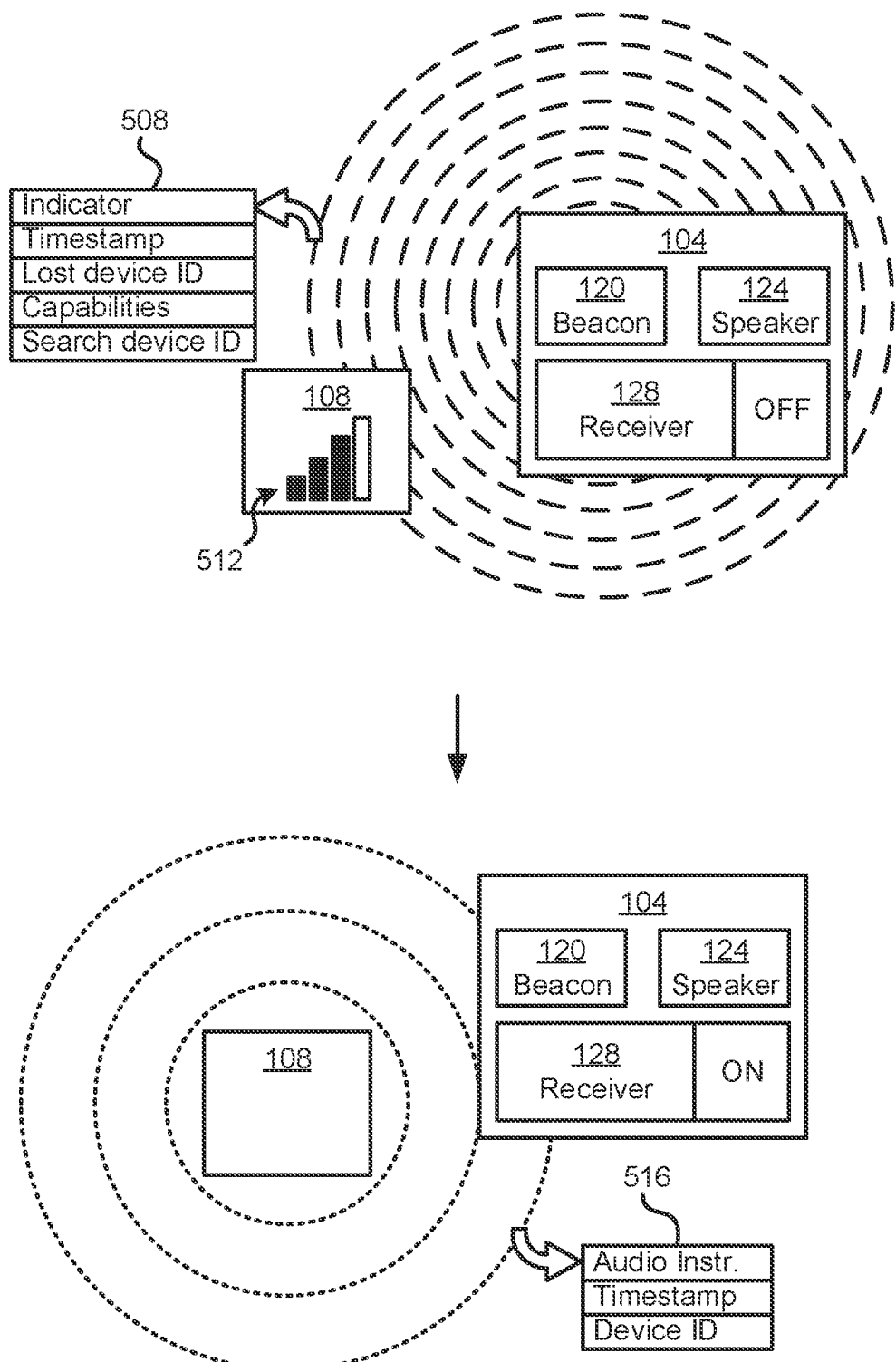
FIG. 6 is a schematic diagram of another example execution of the method of FIG. 2 to find a lost device.

Referring to FIG. 6, in response to the discovery command 504, the lost device 104 may broadcast a modified lost device signal 508 from the beacon 120. In particular, the modified lost device signal 508 is broadcasted at a higher frequency than the lost device signal 300. The modified lost device signal 508 includes an indicator of the next designated reception window, a timestamp of the modified lost device signal 508, the device identifier for the lost device 104, further capabilities of the lost device 104, and the device identifier for the searching device 108 (i.e., to identify the searching device 108 from which the discovery command 504 was received).

As the user of the searching device 108 moves closer to the lost device 104, the searching device 108 determines an RSSI 512 of the modified lost device signal 508. The searching device 108 may select a discovery command 516 based on the RSSI 512. During the designated reception window (i.e., when the receiver 128 of the lost device 104 is ON), the searching device 108 broadcasts the discovery command 516. The discovery command 516, in the present example, includes instructions for the lost device 104 to generate an audio signal, a timestamp of the discovery command 504, and a device ID of the searching device 108.

Figure 7:
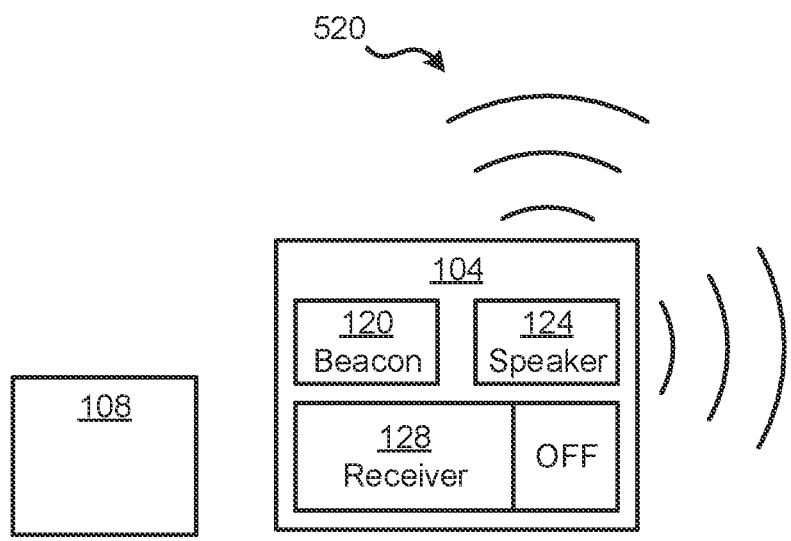
FIG. 7 is a schematic diagram of an example execution of block 240 of the method of FIG. 2.

Referring to FIG. 7, in response to the discovery command 516, the lost device 104 may generate an audio signal 520 from the speaker 124. The audio signal 520 (e.g., a beeping noise, a ringing noise, etc.) may assist the user of the searching device 108 to locate the lost device 104. In some examples, the searching device 108 may include a microphone to capture the audio data, which may be analyzed to provide additional data for locating the lost device 104. Further, in some examples, in addition to the audio signal 520, the lost device 104 may further modify the lost device signal and continue to broadcast a modified lost device signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A mobile computing device comprising:
a beacon transmitter;
a receiver;
a controller connected with the beacon transmitter and the receiver, the controller configured to:
control the beacon transmitter to broadcast a lost device signal, the lost device signal configured for locating the mobile computing device and including an indicator of a designated reception window;
during the designated reception window, enable the receiver; and
in response to receiving a discovery command from a searching device, control the beacon transmitter to transmit a response signal for locating the mobile computing device.

2. The mobile computing device of claim 1, further comprising an audio generator, and wherein the controller is configured to control the audio generator to generate an audio signal as the response signal.

3. The mobile computing device of claim 1, wherein to control the beacon transmitter to transmit the response signal the controller is configured to:
modify parameters of the lost device signal according to the discovery command; and
control the beacon to broadcast the modified lost device signal as the response signal.

4. The mobile computing device of claim 1, wherein the indicator of the designated reception window comprises a countdown value until the designated reception window.

5. The mobile computing device of claim 1, wherein the controller is further configured to disable the receiver outside the designated reception window.

6. The mobile computing device of claim 1, wherein the beacon transmitter comprises a Bluetooth low energy beacon.

7. The mobile computing device of claim 6, wherein the controller is to initiate the broadcasting of the lost device signal from the beacon transmitter in response to a shutdown condition of the mobile computing device.

8. A computing device comprising:
a communications interface;
a controller interconnected with the communications interface, the controller configured to:
in response to receiving a lost device message from a lost device, determine, from the lost device message, a designated reception window; and
during the designated reception window, control the communications interface to transmit a discovery command to the lost device, the discovery command including parameters for a response message configured for locating the lost device.

9. The computing device of claim 8, wherein the discovery command is to cause the lost device to modify the lost device message according to the parameters and broadcast the modified lost device message.

10. The computing device of claim 8, wherein the discovery command is to cause the lost device to generate an audio signal.

11. The computing device of claim 8, wherein the controller is configured to, prior to transmitting the discovery command:
determine a received signal strength indication of the lost device message; and
select the discovery command from a set of discovery commands based on the received signal strength indication.

12. The computing device of claim 11, wherein the controller is configured to:
select a first discovery command to cause the lost device to (i) modify the lost device message according to the parameters and (ii) broadcast the modified lost device message when the received signal strength indication meets a first threshold strength; and
select a second discovery command to cause the lost device to generate an audio signal when the received signal strength indication meets a second threshold strength.

13. The computing device of claim 8, wherein the controller is configured to:
determine a transmitter capability of the lost device from the lost device message; and
select the discovery command from a set of discovery commands based on the transmitter capability of the lost device.

14. A method comprising:
broadcasting, from a beacon transmitter of a lost device, a lost device signal, the lost device signal including an indicator of a designated reception window;
during the designated reception window, enabling a receiver of the lost device;
receiving a discovery command from a searching device during the designated reception window; and
in response to the discovery command, transmitting a response signal for locating the lost device.

15. The method of claim 14, wherein transmitting the response signal comprises generating an audio signal as the response signal.

16. The method of claim 14, wherein transmitting the response signal comprises modifying parameters of the lost device signal according to the discovery command and broadcasting the modified lost device signal as the response signal.

17. The method of claim 14, wherein the indicator of the designated reception window comprises a countdown value until the designated reception window.

18. The method of claim 14, further comprising disabling the receiver outside the designated reception window.

19. The method of claim 14, further comprising initiating the broadcasting of the lost device signal from the beacon transmitter in response to a shutdown condition of the lost device.

20. A method comprising:
   receiving, at a searching device, a lost device message from a lost device;
   in response to receiving the lost device message, determining, from the lost device message, a designated reception window; and
   during the designated reception window, transmitting a discovery command to the lost device, the discovery command including parameters for a response message for locating the lost device.

21. The method of claim 20, wherein the discovery command is to cause the lost device to modify the lost device message according to the parameters and broadcast the modified lost device message.

22. The method of claim 20, wherein the discovery command is to cause the lost device to generate an audio signal.

23. The method of claim 20, wherein transmitting the discovery command comprises:
   determining a received signal strength indication of the lost device message; and
   selecting the discovery command from a set of discovery commands based on the received signal strength indication.

24. The method of claim 23, wherein selecting the discovery command comprises:
   selecting a first discovery command to cause the lost device to (i) modify the lost device message according to the parameters and (ii) broadcast the modified lost device message when the received signal strength indication meets a first threshold strength; and
   selecting a second discovery command to cause the lost device to generate an audio signal when the received signal strength indication meets a second threshold strength.

25. The method of claim 20, wherein transmitting the discovery command comprises
   determining a transmitter capability of the lost device from the lost device message; and
   selecting the discovery command from a set of discovery commands based on the transmitter capability of the lost device.

* * * * *